(No Model.)
A. H. GEORGE.
HAND VISE OR CLAMP.
No. 376,191. Patented Jan. 10, 1888.
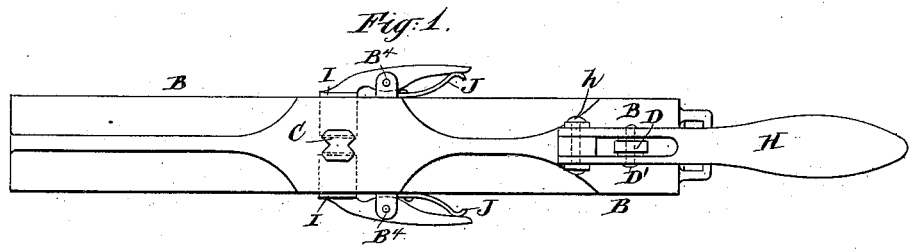
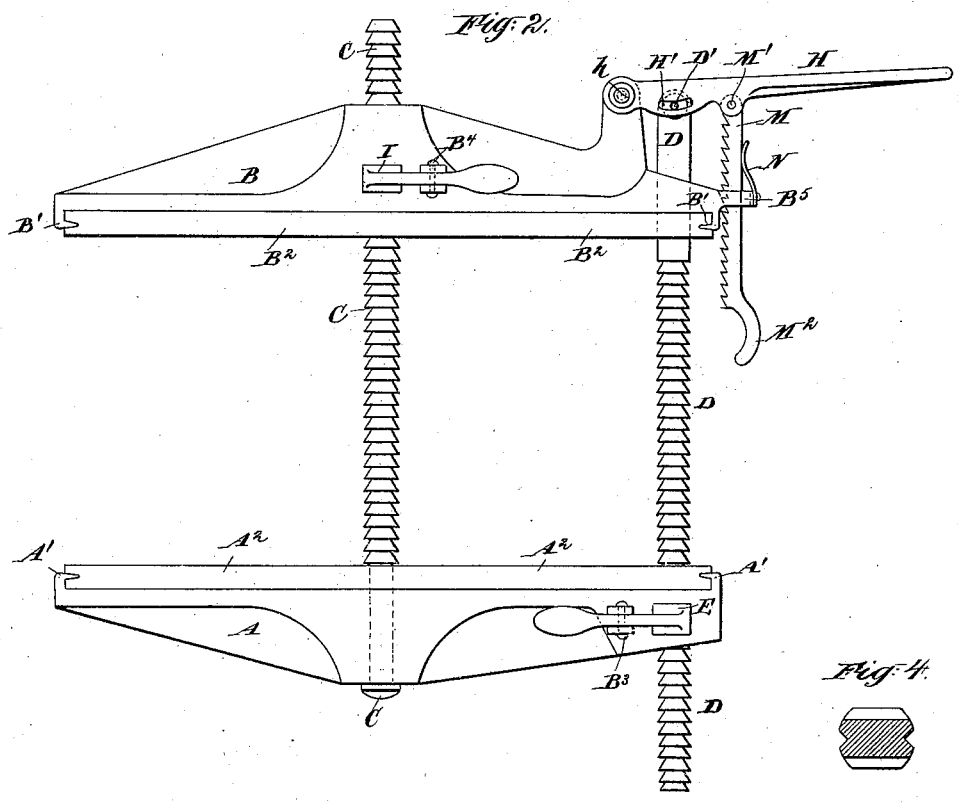
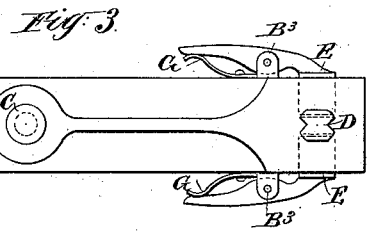
Witnesses:
Charles R. Searle
F. A. Richmond
Inventor:
Adam Henry George
by his attorney
Thomas Drew Stetson

UNITED STATES PATENT OFFICE.

ADAM HENRY GEORGE, OF PASSAIC, NEW JERSEY.

HAND VISE OR CLAMP.

SPECIFICATION forming part of Letters Patent No. 376,191, dated January 10, 1888.

Application filed November 18, 1886. Serial No. 219,228. (No model.)

*To all whom it may concern:*

Be it known that I, ADAM HENRY GEORGE, a subject of the Emperor of Germany, residing at Passaic, in the county of Passaic, in the State of New Jersey, have invented a certain new and useful Improvement in Hand-Clamps, of which the following is a specification.

My device is intended more especially to take the place of the hand-screws used by joiners and others in holding parts together in making glued joints. It may be of service for many analogous uses. The principal parts are preferably of iron or steel. I provide for conveniently holding in each principal part or clamp-jaw a facing-piece of wood or other slightly-yielding material. The jaws may be moved apart or together with facility to any required extent by a direct movement, when set at liberty, by pressing on the proper dogs. So soon as liberated the dogs strongly engage the rack-bars which connect the jaws at the required distance apart to commence seizing the work. A lever is next operated to strain the back ends of the jaws apart. This causes the front or working ends of the jaws to approach each other forcibly to a small extent, thereby effecting the clamping.

The accompanying drawings form a part of this specification, and represent what I consider the best means of carrying out the invention.

Figure 1 is a plan view of my improved hand vise or clamp. Fig. 2 is a side elevation. Fig. 3 is a plan view from below. Fig. 4 is a horizontal section of a portion on a larger scale.

Similar letters of reference indicate like parts in all the drawings where they appear.

A and B are the two principal parts or clamp-jaws, each provided with hooks A' B', adapted to take hold and retain facing-pieces of wood A² B², so as to act kindly on finished pieces of joiner-work or other objects which are to be held. The lower or nearest jaw, A, has a round hole near its mid-length which receives a ratchet-bar, C, which latter is retained by riveting. There is preferably a little looseness, allowing the parts to adapt themselves to various conditions. This bar C has ratchet-teeth in two sides and a longitudinal groove on each of the remaining two sides, as shown in Fig. 4. The jaw A has also a hole corresponding in section at the back end, which receives a corresponding ratchet-bar, D, adjustably secured by dogs E, which are pivoted to A, one on each side, at B³, and are urged into engagement by springs G. The teeth on both the ratchet-bars C and D are inclined in the same direction, so that in order to move the jaws together the dog E must be disengaged, and to move them apart the dog I must be disengaged.

The jaw B has two holes corresponding in position to those in A. The central one is of the peculiar section indicated, and any portion of the rack-bar C can move endwise through it, except as it is controlled by dogs I, pivoted on B at B⁴, and which engage with the teeth of C by the force of springs J when allowed to do so. The back ratchet-bar D is flattened at and near its upper end. This part can move freely endwise through a corresponding hole in B, with liberty for a slight change in the angular position. A cross-pin, D', in D is engaged by slots H' in a forked hand-lever, H, which is pivoted at *h* to an arm on B, and, being operated by the attendant after the device is adjusted, actuates a slight ratchet-bar, M, which is pivoted to H at M' and works through a keeper, B⁵, on B. It is subject to the force of a spring, N, and, the back ends of the jaws A and B having been strained apart, this ratchet-bar M engages with an angular portion of B and holds them firmly, thus strongly compressing and clamping the article embraced between the front ends of A and B. When it is desired to unclamp, the bar M is disengaged by the attendant acting on the handle M², and the hand-lever H is free to turn to relax the strain.

Often the device will be used a number of times in succession in clamping articles of uniform size. When it is desired to change the size, the jaws may be moved apart by a gentle force after disengaging the dogs I, or may be moved together after disengaging the dogs E, until the desired distance is attained. Then the dogs, being all engaged by their respective springs, hold the jaws strongly near the position desired and allow a strong compressive force to be exerted on the article clamped by simply turning the hand-lever H.

The ordinary wooden clamps, composed of two jaws with two screws, are objectionable, from their liability to shrink and swell with changes in the weather. They are, furthermore, slow of operation and involve much time in shifting when it is necessary to shift to a large extent. They are also hard to operate when the pressure is applied. Even when the screws are turned strongly as possible the pressure they give is inferior to that which may be produced by mine with ease.

Modifications may be made in the forms and proportions of the parts within wide limits without departing from the principle or sacrificing the advantages of the invention. I can work successfully on some articles without the soft facings $A^2$ $B^2$. I attach importance to these facing-pieces being of wood, because such are of a sufficiently yielding nature to avoid injuring the article clamped, while they are sufficiently rigid to allow of being held by the hooks A' B' at the ends, thus avoiding any screws or other fastenings in the working-faces. The facings and the means for confining them are durable and of little cost.

My device as a whole is light and cheap, instantly adaptable to a wide range of sizes, and clamping instantly with great firmness.

I claim as my invention—

In a hand-vise or clamp, the jaws A B, ratchet-bars C D, dogs E I, arranged upon the jaws to engage the bars, and springs G J, to force the dogs into engagement with the bars, in combination with the hand-lever H, fulcrumed upon the bar D and pivoted to the jaw B, ratchet-bar M, pivoted to the lever H, an annular projection upon the jaw B, and a spring, N, to force the bar M into engagement with the angular projection, substantially as described.

In testimony whereof I have hereunto set my hand, at New York city, N. Y., this 20th day of October, 1886, in the presence of two subscribing witnesses.

ADAM HENRY GEORGE.

Witnesses:
   F. A. RICHMOND,
   M. F. BOYLE.